United States Patent [19]
Jaggers et al.

[11] 3,779,932
[45] Dec. 18, 1973

[54] SOLID WASHING COMPOSITIONS

[76] Inventors: Brian George Jaggers, 33 Park Dr., Romford; Keith Frederick Ufton, 261 Henley Rd., Ilford; Horst Richard Wagner, 14 Kettleway Way, Ongar, all of England

[22] Filed: June 29, 1971

[21] Appl. No.: 158,048

[30] Foreign Application Priority Data
July 1, 1970  Great Britain.................. 31,862/70

[52] U.S. Cl.................... 252/108, 252/89, 252/135, 252/523, 260/429.3, 260/429.5, 252/522
[51] Int. Cl.............................................. C11d 9/00
[58] Field of Search................... 252/135, 522, 523; 260/429.3, 429.5

[56] References Cited
FOREIGN PATENTS OR APPLICATIONS
163,104    7/1953    Australia................................ 424/66

*Primary Examiner*—John D. Welsh
*Attorney*—Herbert H. Goodman

[57] ABSTRACT

Solid washing compositions such as detergent, soap, bath salt or water softening compositions are perfumed by incorporation thereinto of a monomeric titanate or zirconate ester of a perfumery alcohol or phenol of formula $MA_4$, where M is titanium or zirconium and the groups A are the same or different organic groups at least one of which is a group of formula [— O — R] where R is the residue of a perfumery alcohol or phenol. Said esters provide slow release of aroma by hydrolysis under the conditions of use of said compositions.

26 Claims, No Drawings

SOLID WASHING COMPOSITIONS

This invention relates to solid washing compositions normally used or intended for use in hot or warm water such as soaps, bath salts, solid water-softners, and solid detergent compositions. Such compositions are commonly perfumed. However, many perfumery chemicals have high volatility and are rapidly given off over an initial period of use. There is thus a definite practical limitation on the perfumery materials which can usefully be added to these compositions.

The present invention provides a novel and elegant means of overcoming this difficulty in the case of perfumery alcohols and phenols by the use in solid washing compositions of a titanate or zirconate ester of a perfumery alcohol or phenol.

These compounds have a very low volatility and so may be retained in the compositions almost indefinitely until use. On coming into contact with water they hydrolyse at a rate depending upon the temperature and quantity of the water the pH and the nature of the ester. Some esters may hydrolyse rapidly in cold water, others may require hot or boiling water or even super-heated steam for hydrolysis to proceed at an appreciable rate. The invention therefore provides a broad range of washing compositions, having a multiplicity of available odours which may be induced to come off under various possible conditions of use.

Furthermore, it has been discovered that although the titanate and zirconate esters do not themselves have a strong aroma they nevertheless have the most surprising property that their incorporation into a liquid compounded perfumery composition in some way makes the basic note of the perfume last longer, that is the compounds have a fixative effect on the more volatile perfumery ingredients which appear to be lost less rapidly from the composition. Also, these esters have the effect of blending together the individual odours of the other perfumery ingredients of liquid perfumery compositions resulting in the compositions as a whole having more harmonious odours. Since in normal cases the titanate and zirconate esters will be incorporated into the washing compositions together with other perfumery ingredients as part of a compounded perfumery composition this effect constitutes a further surprising advantage of the invention. The esters are generally soluble in most types of liquid perfumery formulation as presently used.

Accordingly, the present invention provides solid washing compositions comprising one or more monomeric titanium or zirconium compounds containing at least one group of the formula $M - O - R$, where M is titanium or zirconium and R is the residue of a perfumery alcohol or phenol. Such compounds have the general formula $MA_4$ where M is titanium or zirconium and the groups A are the same or different organic groups at least one of which is a group of the formula $[ - O - R ]$.

The perfumery alcohol or phenol may be any odoriferous mono or polyhydric alcohol or phenol used or suggested for use in perfumery compositions, for example such as described in the books 'Synthetic Perfumes' by West, Strausz and Barton, published by Arnold & Co. (London) 1969, 'Soap, Perfumery and Cosmetics,' 7th Edition by W.A. Poucher, published by Chapman & Hall (London), 1959 and 'Perfume and Flavour Chemicals' by by Steffen Arctander, published by the author (Montclair) 1969.

In particular, possible such compounds include linalol; β-phenyl ethyl alcohol; benzyl alcohol; menthol; n hexanol; α-terpineol; eugenol; cis - hex - 3 - en - 1 - ol; n-nonahol; citronellol; n-decanol;geraniol; nerol; myrcenol; dihydro-citronellol; dihydrolinalol; dihydrogeraniol; isoborneol; pelargol; or 2, 6 - dimethyloctan - 8 - ol; farnesol; dihydrofarnesol; nerolidol; γ-phenyl - n - propyl alcohol, γ-phenyl - n - butyl alcohol; ε-phenyl - n - amyl alcohol; cinnamyl alcohol; phenylethylene glycol; anisyl alcohol; odoriferous carbinols, such as dimethylbenzyl carbinol; phenylethyldimethyl carbinol; methylphenyl carbinol; dimethylphenyl carbinol; trichloromethyl phenylcarbinol, ethylbenzylcarbinol, methylbenzylcarbinol, isopropylbenzyl carbinol, ethyl - n - amylcarbinol, methyl - n - amyl - carbinol, ω - hydroxymethyllongifolene, carbinols obtainable by reaction of limonene with formaldehyde (see W. German O L S 19 37 017) such as 6 and 10 hydroxymethyl - 1, 8 - p - methadiene, and 8 - camphene carbinol ( as described in West German O L S 19 36 209) 2 - hydroxy- γ- pinene; verbenol; carveol; 2 - hydroxy - 6 - p - methene; 5 - hydroxy - 3 - p - methene; 3 - hydroxy - 2,5 - dimethyl - 1,4,6 -octatriene; 6,8 - dihydroxy- -1 - p - methene; 1 - hydroxy - 2 - p - methene; 4 - hydroxy - 2 - p - methene; piperitol, carvitol; 3 - hydroxy - 1,1,2,3, -tetramethyl - 4 -cyclohexene; 3 - hydroxy - 2 - methyl - 6 - methylene - 1,7 - octadiene, 1 - hydroxy - 2 - methyl - 6 - methylene - 2,7 - octadiene, 3 - hydroxy - 2 - - dimethyl -1,7 octadiene and 1 - hydroxy - 2,6 - dimethyl - 2,6 -octadiene. Zirconate and titanate esters of residues of hydrocyacids corresponding to perfumery lactones may also be used; such perfumery lactones include ambrettolide; exaltolide and dihydroambrettolide.

Phenol esters of titanates and zirconates which may be used in the compositions of the invention include those of vanillin; eugenol; ethylvanillin; homovanillin; isoeugenol; methyl-iso-eugenol; benzyl-iso-eugenol; thymol and p -tert-butylphenol.

The aforesaid titanate and zirconate esters of perfumery alcohols and phenols of the formula $MA_4$ are believed to be novel with the exception of orthotitanate esters of linalol; menthol; β- phenyl ethyl alcohol; amyl alcohol; hexyl alcohol; isoborneol and benzyl which are variously described, in contexts unconnected with compounded perfumery compositions; in Chem Z vesti 10 , 91 – 5 (1956); Rend 1st Lombardo Sci., Pt I Classe Sci. Mat e Nat 94A 593 – 9 (1960); Ann Chim (Paris) 6 .661 – 76 (1961) and U.S. Pat. No. 3,353,542. With the aforesaid exceptions compounds of the formula $MA_4$ wherein M and R are as hereinbefore defined are included within the scope of the invention.

Particularly preferred novel titanate and zirconate esters are these comprising a group of the formula $M - O - R$ wherein R is a residue of eugenol, terpineol, citronellol, geraniol, nerol, cinnamyl alcohol or 2 - amyl cinnamyl alcohol. Tetra substituted esters of these types are most preferred.

The metallic group M in the compound employed is preferably titanium which is cheaper than zirconium. The esters used may either be liquid or solid. Generally the liquid orthotitanate alcohol esters are those wherein the group R has not more than about 10 to 12 carbon atoms; esters with larger R groups are normally solid. In most cases phenol esters are either solids or very high boiling liquids.

Besides the aforesaid titanate and zirconate esters the novel compositions will normally contain other known perfumery compounds which do not chemically interact with the titanates or zirconates and the odours of which harmonize to form a perfumery blend. In general both the titanate and zirconate oligomers will be compatible with most of the diversity of materials known to perfumers in compounding perfumery compositions according to well-established principles, e.g., materials such as described in the books 'Synthetic Perfumes,' by West Strausz and Barton; published by Arnold and Co. (London) 1949 and 'Soap, Perfumery and Cosmetics,' Vol II, 7th Edition, by Poucher; published by Chapman & Hall Ltd. (London), 1959, and 'Perfume and Flavour Chemicals' by Steffen Arctander, published by the author(Montclair) 1969, which books are hereby incorporated herein in their entirities.

The novel compositions may also advantageously comprise a mixture of oligomeric titanate or zirconate ester of a perfumery alcohol or phenol, the use of which in washing compositions is described in our co-pending UK Application No. 31863/70 filed of even date herewith. Such oligomeric esters have the formula

where $n$ is an integer M is as before and the groups A are the same or different organic groups at least one of which has the formula $[-OR]$; where R is as herein defined. They are characterized by their formation by hydrolysis of a corresponding monomeric ester $MA_4$ with from 50 to 90, preferably 50 to 80, most preferably 50 to 60 moles $H_2O$ per 100 moles $MA_4$. The monomeric esters are in general more easily hydrolysed than the oligomers and will therefore often be used in conjunction with oligomers where a rapid initial release of perfume together with a slower release over a period or possibly at an elevated temperature is required.

The nature of the ester which is chosen for use in any particular washing composition will depend upon the required perfumery characteristics and upon the ease of hydrolysis of the ester with regard to the conditions of use of the composition. For example the ester chosen may have a rate of hydrolysis at the projected temperature of use of the composition such as to ensure a steady release of perfume by hydrolysis throughout the duration of a normal washing operation. Alternatively an ester may be selected which hydrolyses rapidly so as to bring about a quick release of perfume at the start of the washing operation. In some cases it may be desired to bring about release of perfume during two different and distinct stages of use of a composition, e.g., during the washing and the subsequent ironing steps of a laundering operation. For this purpose use may either be made of a mixed ester comprising two or more residues of perfumery alcohols or phenols with different rates of hydrolysis or, alternatively, a mixture of two or more different titanate or zirconate esters, or possibly mixed oligomeric esters such as described in our aforesaid co-pending Application may be used, at least one ester being hydrolysable below 100°C and at least one being hydrolysable above this temperature.

Particularly preferred esters for use in the novel 20 which are tetra eugenyl orthotitanate tetra - α-terpinyl orthotitanate, tetra-linalyl orthotitanate, tetra-β-phenyl ethyl orthotitanate, tetra-citronellyl orthotitanate, tetra-geranyl orthotitanate, tetra-neryl orthotitanate, tetra-benzyl orthotitanate, tetra-cinnamyl orthotitanate and tetra - 2 - amyl-cinnamyl orthotitanate.

It is preferred that at least two, and most preferably all four groups R in the esters used should be perfumery alcohol or phenol residues. Groups R which are derived other than from a perfumery alcohol or phenol may be any organic groups which do not impair the qualitites of the perfume for example non-perfumery alkyl or acyl groups. Where two groups R are to be non-perfumery groups they may also be comprised in the same molecule of a difunctional compound such as a diol a hydroxy-acid such as lactric acid or an alkylolamine such as triethanolamine. Such difunctional derivatives are generally less readily hydrolysed than derivatives of mono-functional organic groups. Alkylolamines and hydroxy-acids also often form 6-co-ordinate chelated compounds with titanium and zirconium which further decreases the ease of hydrolysis. Diols which may be used include hexylene glycol ( 2-methylpentane-2,4-diol); 2-ethylhexane-1, 3-diol and hexane 1-6, diol.

The titanate and zirconate esters for use according to the invention may be prepared by known means, e.g., by reaction of titanium or zirconium tetrachloride with excess alcohol or phenol. Removal of hydrogen chloride liberated by the reaction is necessary in order to effect substitution greater than disubstitution and this may be done either by conducting the reaction in the presence of metallic sodium or by passing anhydrous ammonia through the reaction mixture. After reaction unreacted alcohol or phenol may be removed from the mixture by distillation, if necessary under reduced pressure. The titanium or zirconium ester product may be purified by distillation if desired. The esters may also readily be prepared from tetre-esters by alcohol or phenol interchange using stoichiometric quantities of alcohol and preferably starting from the ester of the lower boiling alcohol which latter may be removed by distillation as the reaction proceeds. Tetra(o-butyl) titanate is often a convenient starting material. Mixed esters containing residues of both perfumery and non-perfumery alcohols or phenols or esters containing residues of different perfumery alcohols or phenols may be prepared by the same means. Orthotitanates or zirconates may also be reacted with carboxylic acids, hydroxycarboxylic acids or other chelating agents such as alkylolamines in similar fashion to give esters containing both perfumery and non-perfumery substituents. In all such cases reactions are conveniently conducted by concurrent removal of displaced alcohol.

The novel washing compositions may be any solid perfumed materials or mixtures employed as washing adjuvants and normally intended for use in warm or hot water. Such compositions include solid soaps; bath salts, which may for example variously contain sodium carbonate, sodium sesquicarbonate, sodium perborate, sodium phosphate, sodium chloride, ammonium carbonate or borax together with perfumes, colouring agents and minor amounts of other additives for modifying or retaining the physical properties; water softeners such as sodium hexametaphosphate (as sold under the trade names 'Calgon' or 'Metagon'), detergents which commonly comprise a surfactant material together with builders such as sodium tripolyphosphate, sodium nitrolotriacetate, sodium metasilicate and sodium pyrophosphate as well as perfumes and, possibly, colouring agents and solid cleaning and/or sterilising compositions for specialised uses.

The quantities of titanate or zirconate ester used in the novel washing compositions may vary widely depending upon the nature of the composition and upon the characteristics of the perfume. For example detergent compositions will generally comprise from 0.02 to 1 percent by weight, say 0.05 to 0.5 percent by weight of a compounded perfumery composition whereas bath salts usually comprise from 0.1 to 10 percent, say 0.5 to 5 percent by weight of a compounded perfumery composition. In the present case where the titanate or zirconate ester is employed as a primary ingredient of a compounded perfumery composition the latter may subsist largely or predominantly as such ester. On the other hand the titanate or zirconate ester may function in the compounded perfumery composition as a fixative for other odoriferous components, in which case its concentration in the composition will be relatively small. However, in the general case the esters will represent from 1 to 98 percent, more usually from 2 to 70 percent by weight of a compounded perfumery composition which will itself, in the general case, represent from 0.02 to 15 percent by weight of the solid washing composition, say 0.05 or 0.5 to 10 percent. If the solid washing composition does not comprise a compounded perfumery composition the titanate or zirconate ester may still be used in like quantities as indicated by the above ranges, e.g., in the general case from 0.01 to 20 percent, more usually 0.01 to 10 percent, e.g. 0.01 to 5 percent or 0.05 to 5 percent or 0.5 to 10 percent by weight on the solid washing composition.

The novel washing compositions may be compounded in known manner, e.g. by intimate mixing of a solid ester with the other solid ingredients of the composition or by impregnation of the latter with a liquid ester or with a solution of solid ester in a suitable solvent which may then be evaporated. Alternatively in the case of detergents it may be possible to spray a liquid ester or an ester solution onto the detergent and/or to spray mix a solid ester into the composition at a later stage.

In most cases however the washing compositions will be manufactured by mixing the solid ingredients with a liquid compounded perfumery composition comprising one or more titanate esters. A particularly preferred type of novel solid detergent composition comprises at least one titanate or zirconate ester as aforesaid which is hydrolysable below 100°C and at least one other such ester hydrolysable above 100°C. The latter may be an oligomeric ester. Alternatively a mixed ester which is partially hydrolysable below 100°C and also hydrolysable above this temperature can be employed in this way. Compositions thus formulated may be designed to give rise to a perfumery odour throughout both the washing and the subsequent ironing stages of a laundering by the respective hydrolyses in each stage.

This invention is illustrated by the following Examples whereof Examples I and II describe the preparation of titanates for use according to the invention and Examples III, IV and V describe novel washing compositions. All parts are by weight.

EXAMPLE I
PREPARATION OF TETRAEUGENYL orthoTITANATE

REACTANTS:
 74g tetra n- butyl orthotitanate (0.22 mole)
 144g eugenol (0.88 moles)
APPARATUS:
 250ml 3-necked flask
 thermometer
 distillation unit.
METHOD:
 To the 74g of tetra n-butyl orthotitanate in the dry 250ml flask 144g of eugenol were added. The pressure in the distillation system was 20mms Hg; the contents of the flask were heated and n-butanol was given off and collected as distillate. When the pot temperature reached 120°C the pressure in the system was cautiously reduced to 5mms Hg and more butanol was collected. The temperature fell and rose again to 120°C. A pressure of 0.1mm Hg was applied until no more butanol was distilled. The theoretical amount of butanol was collected, (65g). 153g of tetra-eugenyl ortho-titanate was obtained as a dark red extremely viscous liquid.

EXAMPLE II
PREPARATION OF TETRA α-TERPINEYL orthoTITANATE

REACTANTS:
 74g tetra n-butyl orthotitanate (0.22 mole)
 136g α-terpineol (0.88 mole)
APPARATUS:
 250ml 3-necked flask
 thermometer
 distillation unit
The method used was in Example I. The theoretical amount of butanol was collected leaving 145g tetra α-terpineyl ortho-titanate as a very viscous liquid.

EXAMPLE III

A lilac perfume incorporating orthotitanates was prepared from the following ingredients:

| | |
|---|---|
| Coumarin | 5 |
| Lauryl Aldehyde | 5 |
| Citronellyl Acetate | 10 |
| Heliotropin | 10 |
| Rose Base | 10 |
| Anisaldehyde | 20 |
| Cyclamen Aldehyde | 20 |
| Phenyl Acetaldehyde Dimethyl Acetal | 20 |
| Terpineyl Acetate | 20 |
| Benzyl Acetate | 30 |
| Phenyl Ethyl Alcohol | 30 |
| Linalol | 50 |
| Musk Xylene | 50 |
| Terpineol | 400 |
| Tetra α-phenyl Ethyl Titanate | 30 |
| Tetra Linalyl Titanate | 40 |
| Tetra Terpineyl Titanate | 250 |
| Total | 1000 |

Quantities of this perfume were thoroughly mixed into a standard solid domestic spray-dried detergent powder comprising approximately 35 percent sodium tripolyphosphate, 22 percent sodium perborate, 18 percent sodium dodecyl benzene sulphonate, 12 percent sodium sulphate together with small quantities various other additives such as coconut monethanolamide, ethylene diamine tetraacetric acid, sodium carboxymethyl cellulose and optical brightners. The thus perfumed detergents comprised from 0.05 to 0.25 percent of the above perfumery formulation. The alcohols present as titanate esters were retained during storage and hydrolysed rapidly on addition of the perfumed detergent to water, giving off their characteristic perfumery notes.

EXAMPLE IV

A freesia type perfume incorporating orthotitanates was prepared from the following ingredients:

| | |
|---|---|
| Iso Jasmone | 1 |
| Nona Dieneal 10% in Di Ethyl Phthalate | 1 |
| Octyl Aldehyde 10% in Di Ethyl Phthalate | 1 |
| Phenyl Ethyl Isobutyrate | 1 |
| Methyl Eugenol | 2 |
| Geranyl Acetate | 3 |
| Linalyl Acetate | 3 |
| Benzyl Alcohol | 4 |
| Benzyl Phenyl Acetate | 4 |
| Lauryl Aldehyde 10% in Di Ethyl Phthalate | 4 |
| Para tertiary Butyl alpha Methyl Hydro cinnamic aldehyde | 4 |
| Terpeneless Petitgrain Oil | 4 |
| Cinnamyl Acetate | 6 |
| Amyl Cinnamic Aldehyde | 8 |
| Methyl Ionone | 8 |
| Iso butyl salicylate | 8 |
| Hydroxycitronellal | 10 |
| Benzyl Acetate | 12 |
| Alpha Ionone | 20 |
| Linalol | 200 |
| Tetra Eugenol Titanate | 5 |
| Tetra Phenyl Ethyl Titanate | 10 |
| Tetra Linalyl Titanate | 681 |
| Total | 1000 |

Quantities of this perfume were then thoroughly mixed with a bath salts preparation consisting of 800 parts sodium sesquicarbonate and 200 part borax. The thus perfumed bath salts comprised from 0.5 to 4 percent of the perfume. The titanate-esterified perfumery ingredients were retained on storage and released by hydrolysis on addition of the salts to water.

EXAMPLE V

A rose perfume was prepared according to the following formulation:

| | |
|---|---|
| Phenyl Ethyl Iso Butyrate | 5 |
| Benzyl Propionate | 10 |
| Diphenyl Oxide | 10 |
| Phenyl Ethyl Phenyl Acetate | 10 |
| Phenyl Acetaldehyde Di Methyl Acetal | 20 |
| Trichloro Methyl Phenyl Carbinyl Acetate | 20 |
| Geranyl Acetate | 30 |
| Tetra Neryl Titanate | 20 |
| Tetra (Para Tert Butyl Cyclohexyl) Titanate | 30 |
| Tetra (Tetra Hydro Geranyl) Titanate | 150 |
| Tetra Phenyl Ethyl Titanate | 300 |
| Tetra Citronellyl Titanate | 395 |
| Total | 1000 |

The titanate esters used were prepared in a manner analogous to the method of Example I. The thus prepared liquid formulation was then mixed into quantities of the solid water softening product sold under the registered trade mark 'Calgon' in quantities of from 0.05 to 0.25 percent by weight perfume on the water softener to give a range of perfumed water softeners exhibiting slow release of odour on use and increased longevity of aroma potential.

We claim:
1. Solid perfumed washing compositions containing at least one washing adjuvent and containing as a perfumery component at least one compound selected from the group consisting of perfumery monomeric titanium and zirconium esters containing at least one group of the formula M — O — R wherein M is titanium or zirconium and R is the residue of a perfumery alcohol or phenol.

2. A perfumed washing composition according to claim 1 wherein said perfumery alcohol or phenol is selected from the group consisting of linalol; β-phenyl ethyl alcohol; benzyl alcohol; menthol; n hexanol; α-terpineol; eugenol; cis-hex-3-en-1ol; n-nonahol; citronellol; n-decanol; geraniol; nerol; myrcenol; dihydrocitronellol; dihydrolinalol; dihydrogeraniol; isoborneol; pelargol; or 2,6-dimethyloctan-8-ol; farnesol; dihydrofarnesol; nerolidol; γ-phenyl-n-propyl alcohol; γ-phenyl-n-butyl alcohol; ε-phenyl-n-amyl alcohol; cinnamyl alcohol; 2-amyl-cinnamyl alcohol phenylethylene glycol; anisyl alcohol; dimethylbenzyl carbinol; phenylethyldimethyl carbinol; methylphenyl carbinol; dimethylphenyl carbinol; trichloromethyl phenylcarbinol; ethylbenzylcarbinol; methylbenzylcarbinol; isopropylbenzyl carbinol; ethyl-n-amylcarbinol; methyl-n-amylcarbinol, ω-hydroxymethyllongifolene; 6-and 10-hydroxymethyl-1,8-p-methadiene; ε-camphene carbinol; 2-hydroxy-γ-pinene; verbenol; carveol; 2-hydroxy-6-p-menthene; 5-hydroxy-3-p-menthene; 3-hydroxy-2,5-dimethyl-1,4,6-octatriene; 6,8-dihydroxy-1-p-menthene; 1-hydroxy-2-p-methene; 4-hydroxy-2-p-menthene; piperitol, carvitol; 3-hydroxy-1,1,2,3-tetramethyl-4-cyclohexene; 3-hydroxy-2-methyl-6-methylene-1,7-octadiene; 1-hydroxy-2-methyl-6-methylene-2,7-octadiene; 3-hydroxy-2-dimethyl-1,7-octadiene; 1-hydroxy-2,5-dimethyl-2,6-octadiene; ambrettolide; exaltolide; dihydroambrettolide; vanillin; eugenol; ethylvanillin; homovanillin; isoeugenol; methyliso-eugenol; benzyl-iso-eugenol; thymol and p-tert-butylphenol.

3. A perfumed washing composition according to claim 2 wherein said compound has the formula M(OR)$_4$ and wherein M is titanium.

4. A perfumed washing composition according to claim 2 wherein M is titanium; wherein at least one of said monomeric esters contains two groups R and wherein the remaining two valencies of M are satisfied by bonding to different oxygen atoms in a single molecule of a difuctional organic compound selected from the group consisting of diols, hydroxyacids and alkylolamines.

5. A perfumed washing composition according to claim 1 wherein said compound has the formula M(OR)$_4$, wherein M is titanium and R is the residue of at least one compound selected from the group consisting of vanillin, eugenol; ethylvanillin; monovanillin; isoeugenol; methyl-iso-eugenol; benzyl-iso-eugenol; thymol, p-tert-butyl phenol, terpineol; linalol; β-phenyl ethanol; citronellol; geraniol; nerol; benzyl alcohol; cinnamyl alcohol and 2-amyl -cinnamyl alcohol.

6. A perfumed washing composition according to claim 3 which also contains at least one perfumery component other than said monomeric titanium esters and said monomeric titanium esters are from 1-98 percent by weight of the total weight of perfumery components in said washing composition.

7. A perfumed washing composition according to claim 6 wherein said monomeric titanium esters are from 2–70 percent by weight of the total weight of perfumery components in said washing composition and wherein said total perfumery components are from 0.02–15 percent by weight of the said washing composition.

8. A perfumed washing composition according to claim 5 which also contains at least one perfumery component other than said monomeric titanium esters and said monomeric titanium esters are from 1–98 percent by weight of the total weight of perfumery components in said washing composition.

9. A perfumed washing composition according to claim 8 wherein said monomeric titanium esters are from 2–70 percent by weight of the toal weight of perfumery components in said washing composition and wherein said total perfumery components are from 0.02–15 percent by weight of the said washing composition.

10. A perfumed washing composition according to weight of 9 wherein said monomeric titanate esters are present in an amount of from 0.01–20 percent by weightof said washing composition.

11. A perfumed washing composition according to claim 8 which contains a plurality of said titanate or zirconate esters having differing rates of hydrolysis in water at a given temperature.

12. Solid perfumed washing compositions containone at least one washing adjuvant selected from the group consisting of solid soaps, sodium carbonate, sodium sesquicarbonate, sodium perborate, sodium phosphate, sodium chloride, ammonium carbonate, borax, sodium hexametaphosphate, surfactants, sodium tripolyphosphate, sodium nitrilotriacetate, sodium metasilicate and sodium pyrophosphate and containing as a perfumery component at least one compound selected from the group consisting of perfumery monomeric titanium and zirconium esters containing at least one group of the formula M-O-R wherein M is titanium or zirconium and R is the residue of a perfumery alcohol or phenol.

13. A perfumed washing composition according to claim 12 wherein said perfumery alcohol or phenol is selected from the group consisting of linalol; β-phenyl ethyl alcohol; benzyl alcohol; menthol; n-hexanol; α-terpineol; eugenol; cis-hex-3-en-1-ol; n-nonahol; citronellol; n-decanol; geraniol; nerol; myrcenol; dihydrocitronellol; dihydrolinalol; dihydrogeraniol; isoborneol; pelargol; or 2,6-dimethyloctan-8-ol; farnesol; dihydrofarnesol; nerolidol; γ-phenyl-n-propyl alcohol; γ-phenyl-n-butyl alcohol; ε-phenyl-n-amyl alcohol; cinnamyl alcohol; 2-amyl-cinnamyl alcohol phenylethylene glycol; anisyl alcohol; dimethylbenzyl; carbinol; phenylethyldimethyl carbinol; methylphenyl carbinol; dimethylphenyl carbinol; trichloromethyl phenylcarbinol; ethylbenzylcarbinol; methylbenzylcarbinol; isopropyl-benzyl carbinol; ethyl-n-amylcarbinol; methyl-n-amyl-carbinol, ω-hydroxymethyllongifolene; 6-and 10-hydroxymethyl-1,8-p-methadiene; ε-camphene carbinol; 2-hydroxy-γ-pinene; verbenol; carveol; 2-hydroxy-6-p-menthene; 5-hydroxy-3-p-menthene; 3-hydroxy-2,5-dimethyl-1,4,6-octatriene; 6,8-dihydroxy-1-p-menthene; 1-hydroxy-2-p-menthene; 4-hydroxy-2-p-menthene; piperitol; carvitol; 3-hydroxy-1,1,2,3-tetramethyl-4-cyclohexene; 3-hydroxy-2-methyl-6-methylene-1,7-octadiene; 1-hydroxy-2-methyl-6-methylene-2,7-octadiene; 3-hydroxy-2-dimethyl-1,7-octadiene; 1-hydroxy-2,6-dimethyl-2,6-octadiene; ambrettolide; exaltolide; dihydroambrettolide; vanillin; eugenol; ethylvanillin; homovanillin; isoeugenol; methyliso-eugenol; benzyl-iso-eugenol; thymol and p-tertbutylphenol.

14. A perfumed washing composition according to claim 12 wherein said compound has the formula M(OR)$_4$ and wherein M is titanium.

15. A perfumed are composition according to claim 12 wherein M is titanium; wherein at least one of said monomeric esters contains two groups R and wherein the remaining two valencies of M re satisfied by bonding to different oxygen atoms in a single molecule of a difunctional organic ompound selected from the group consisting of diols, hydroxyacids and alkylolamines.

16. A perfumed washing composition according to claim 12 wherein said compound has the formula M(OR)$_4$, wherein M is titanium snd R is the residue of at least one compound selected from the group consisting of vanillin, eugenol; ethylvanillin; monovanillin, isoeugenol; methyl-iso-eugenol; benzyl-iso-eugenol; thymol; p-tert-butyl phenol; terpineol; linalol; β-phenyl ethanol; citronellol; geraniol; nerol; benzyl alcohol; cinnamyl alcohol and 2-amyl-cinnamyl alcohol.

17. A perfumed washing composition according to claim 12 which also contains a mixture of oligomeric titanate or zirconate esters of the formula A$_3$M-(OMA$_2$)$_n$A, wherein n is an integer and the groups A are the same or different organic groups, at least one of which has the formula (—OR), said mixture having been formed by hydrolysis of a monomeric titanate or zirconate ester, MA$_4$ with from 50 to 90 moles water per 100 moles of ester MA$_4$.

18. A perfumed washing composition according to claim 14 which also contains at least one perfumery component other than said monomeric titanium esters and said monomeric titanium esters are from 1–98 percent by weight of the total weight of perfumery components in said washing composition.

19. A perfumed washing composition according to claim 18 wherein was monomeric titanium esters are from 2–70 percent by weight of the total weight of perfumery components in said washing composition and wherein said total perfumery components are from 0.02–15 percent by weight of the said washing composition.

20. A perfumed washing composition according to claim 16 which also contains at least one perfumery component other than said monomeric titanium esters and said monomeric titanium esters are from 1–98 percent by weight of the total weight of perfumery components in said washing composition.

21. A perfumed washing composition according to claim 20 wherein said monomeric titanium esters are from 2–70 percent by weight of the total weight of perfumery components in said washing composition and wherein said total perfumery components are from 0.02–15 percent by weight of the said washing composition.

22. A perfumed washing composition according to claim 21 wherein said monomeric titanium esters are from 2–70 percent by weight of the total weight of perfumery components in said washing composition.

23. A perfumed washing composition according to claim 22 wherein the total perfumery components are from 0.02–15 percent by weight of said solid washing composition.

24. A perfumed washing composition according to claim 18 wherein said monomeric titanate esters are present in an amount of 0.01–20 percent by weight of said washing composition.

25. A perfumed washing composition according to claim 18 which also contains a plurality of titanate or zirconate esters having differing rates of hydrolysis in water at a given temperature.

26. A perfumed washing composition according to claim 20 which also contains a plurality of titanate or zirconate esters having differing rates of hydrolysis in water at a given temperature.

* * * * *

UNITED STATES PATENT OFFICE
CERTIFICATE OF CORRECTION

Patent No. 3,779,932          Dated December 18, 1973

Inventor(s)    BRIAN GEORGE JAGGERS et al

It is certified that error appears in the above-identified patent and that said Letters Patent are hereby corrected as shown below:

Column 8, line 16, delete "pelargo; or".

Column 8, line 34, replace "2,5" with 2,6".

Column 9, line 20, replace "weight of 9" with --claim 3--.

Column 9, line 48, delete "pelargo; or".

Column 10, line 11, replace "re" with --are--.

Signed and sealed this 17th day of September 1974.

(SEAL)
Attest:

McCOY M. GIBSON JR.           C. MARSHALL DANN
Attesting Officer             Commissioner of Patents